United States Patent [19]

Dezzani

[11] 3,948,678
[45] Apr. 6, 1976

[54] SOLDER IRON DRESSING SYSTEM HAVING A TEFLON PACKING

[76] Inventor: John Dezzani, 10513 Downey Norwalk Road, Norwalk, Calif. 90650

[22] Filed: Jan. 7, 1974

[21] Appl. No.: 431,261

[52] U.S. Cl. .............. 134/6; 15/210 R; 15/236 A; 134/31; 228/57; 428/422
[51] Int. Cl.² .......................................... B08B 1/00
[58] Field of Search .............. 134/6, 19, 31, 32, 42; 15/104 R, 209 R, 209 A, 210 R, 236 A, 268, 423; 248/176; 228/18, 19, 22, 57; 117/138.8 UF, 140 R; 428/396, 402, 422

[56] References Cited
UNITED STATES PATENTS

| 2,213,367 | 9/1940 | Kuehl | 15/236 A |
|---|---|---|---|
| 2,281,162 | 4/1942 | Kuehl | 15/236 A |
| 2,365,022 | 12/1944 | Sturtevant | 15/210 R |
| 2,570,041 | 10/1951 | Wedmore | 15/236 A |

Primary Examiner—S. Leon Bashore
Assistant Examiner—Richard V. Fisher
Attorney, Agent, or Firm—Nilsson, Robbins, Bissell, Dalgarn & Berliner

[57] ABSTRACT

An appliance is disclosed for dressing the working surface, e.g. tip, of a soldering iron. A housing of chemically-stable material defines a treatment chamber with an access opening through which the tip of a soldering iron is received. The treatment chamber is partially filled by a packing which in the disclosed embodiment includes Teflon shavings carrying a cleaning agent including ammonium chloride. The insertion of a hot iron results in the vaporization of a quantity of the cleaning agent as well as some scrubbing action by the packing with the effect that the tip of the iron is effectively dressed, removing oxides and foreign particles while leaving a coating of liquid solder on the tip at an operating temperature.

6 Claims, 3 Drawing Figures

U.S. Patent   April 6, 1976   3,948,678
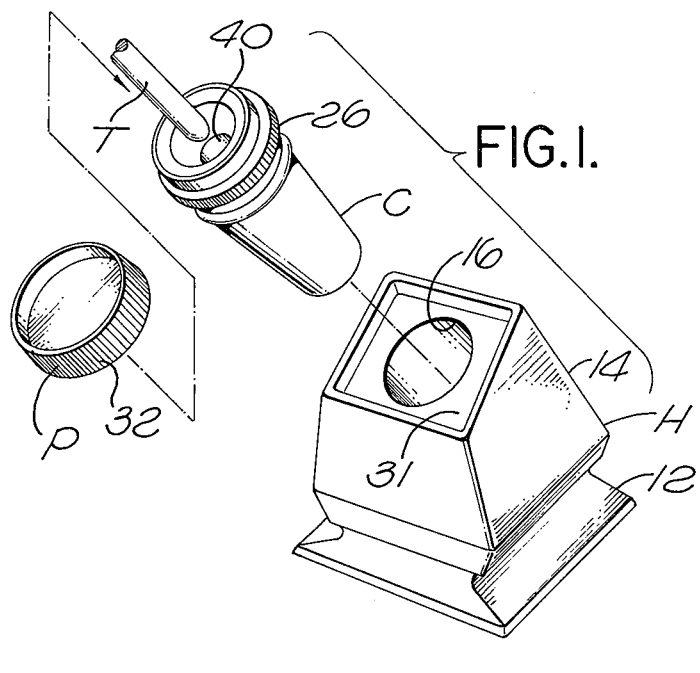
FIG.1.
FIG.3.
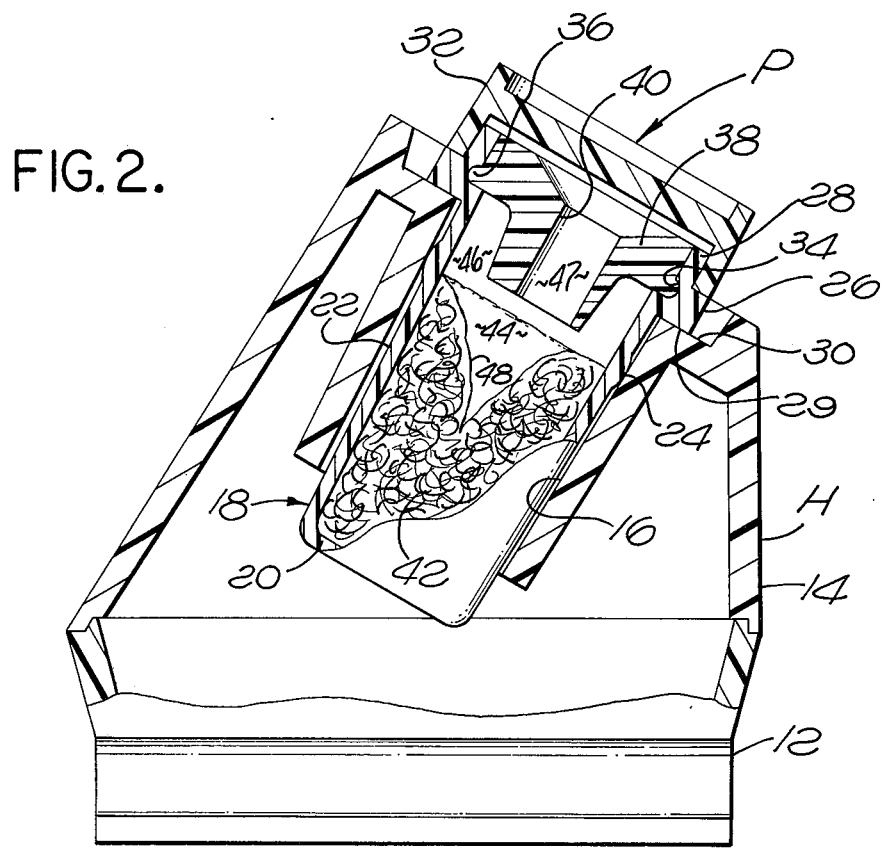
FIG.2.

SOLDER IRON DRESSING SYSTEM HAVING A TEFLON PACKING

BACKGROUND AND SUMMARY OF THE INVENTION

Conventionally, soldering irons incorporate a working end or tip, traditionally of copper, serving to supply heat, as for applying (or removing) molten solder. The effect of molten solder on the copper tends to be deleterious and as a consequence it has become rather widespread practice to plate the tips of soldering irons, as with alloys of nickel or iron. Such plated tips are quite durable as long as a coating of solder is maintained as a protective cover. However, exposure of the plating when the iron is hot tends to result in oxides so that in time the plating becomes pitted and perforated and in due course the tip becomes difficult to use.

Although various techniques have been employed, conventional practice involves frequently dressing the tip of a soldering iron. Specifically, the tip is cleaned of oxides and "tinned" or covered with a clean coating of solder. In actual practice, when an electric soldering iron is momentarily at rest, it is generally maintained at an operating temperature with the result that some oxides are produced on the surface of the molten solder coating. Conventionally, such oxides are removed by rubbing the working surfaces of the iron on a wet sponge. Although such a practice is effective to clean the iron, it has some inherent disadvantages. First, the wet sponge cools the iron with the result that some delay may be involved while the iron returns to a working temperature. Also, dry parts of the sponge are sometimes contacted, with the result that fragments of burned sponge are deposited on the working surface of the soldering iron to contaminate solder deposits. Finally, the wet sponge tends to completely remove the solder coating, exposing the plating with the adverse effects as described above.

Of course, it is to be recognized that various other techniques have been employed for maintaining and using soldering irons; however, certain disadvantages are generally characteristic, as in the widespread practice of using a wet sponge. Specifically, the difficulties are generally recognized to be in maintaining a coating of molten solder on the working surface or tip of the iron, which coating can be periodically cleared of an oxide skin without cooling the iron or introducing contaminants. In general, the present invention is directed to an appliance for simply and easily treating or dressing a soldering iron in view of these considerations.

BRIEF DESCRIPTION OF THE DRAWING

In the drawing, which constitutes a part of this specification, an exemplary embodiment demonstrating various objectives and features hereof is set forth as follows:

FIG. 1 is a partially exploded view of an appliance constructed in accordance with the present invention and also showing a fragment of a soldering iron tip;

FIG. 2 is a central vertical sectional view taken through the appliance of FIG. 1 in an assembled form; and FIG. 3 is an enlarged sectional view of a fragment of a component provided in the appliance of FIG. 1.

DESCRIPTION OF THE ILLUSTRATIVE EMBODIMENT

As required, a detailed illustrative embodiment of the invention is disclosed herein. The embodiment, although deemed best for present purposes and as currently contemplated, is to be recognized as exemplary. Also, it is to be recognized that the present invention may be constructed in various other forms, some of which may be quite different from the disclosed illustrative embodiment. However, the specific structural and functional details disclosed herein are deemed to be merely representative and in that regard provide a basis for the claims herein which define the scope of the invention.

Referring initially to FIG. 1, there is shown an open cartridge C (cap P removed) spaced apart from a holding stand H. The cartridge C may be hand held to dress a soldering iron or, alternatively, may be fitted into the stand H for use, as on a work bench. A fragment of a tip T of a soldering iron is indicated to be received in the cartridge C. Simply inserting the tip T into the cartridge C effectively dresses the tip T upon removal.

Generally, the stand H includes a base 12 which is integrally formed with a holder section 14 defining a somewhat-cylindrical bore or well 16 which, as a matter of convenience, is somewhat offset from the vertical. The well 16 matingly receives and supports the cartridge C for convenient use on a table or work bench.

The cartridge C includes the cap P which is removed during use of the appliance and otherwise is fitted on a body 18 (FIG. 2) which includes a tapered, cylindrical section 22 and incorporates an integral bottom 20. The cylindrical section 22 of the body 18 mates with the well 16 and incorporates an annular ridge 24 for snugly adapting the body 18 within the well 16 of the stand H.

The upper or external end (remote from the bottom 20) of the cylindrical section 22 is integral with an annular flange 26 above which the body 18 terminates in a rim 28. The flange 26 provides a shoulder 29 for abutting engagement with a facing shoulder 30 defined by a recess 31 (FIG. 1) in the stand H about the tapered bore 16. The rim 28 receives the cap P, these two elements being fitted together in a friction fit. The external annular surface 32 of the cap P is knurled for easy removal from the body 18.

Inside the rim 28 (FIG. 2) at a location somewhat aligned with the flange 26, an annular indentation 34 is provided in the body 18 to receive an annular ridge 36 of a cartridge insert or guide 38. The guide 38 defines an orifice 40 which lies inside the tapered, cylindrical section 22 (as depicted).

The cartridge body 18 serves as a housing for a Teflon (tetrafluoroethylene resins) packing 42 in the form of a loose, open or porous, heat-resistant, non-abrasive non-metallic mass which carries a vaporizing cleaning substance as considered in greater detail below. It is to be noted that the packing 42 along with the cartridge body 18 and the guide 38 define a space 44 the upper portion of which is terminated by a closed, annular chamber 46 while the offset portion 47 extends through the guide 38 and is terminated by the cap P.

In general, the appliance as depicted is employed simply by inserting the tip T (FIG. 1) of a soldering iron through the guide 38 into a somewhat-conical indentation 48 so that the working surfaces of the iron contacts the packing 42. The dressing operation is set forth below in somewhat greater detail.

Considering an exemplary manufacture of the appliance, the stand H has been formed of molded plastic in one successful embodiment, and consists of separate components in the form of the base 12 and the upper section 14. The two members may be variously affixed together using well known plastic fabrication techniques.

The components of the cartridge C (body 18, guide 38 and cap 32) may also be formed of plastic. Specifically, in one successful embodiment, the body 18 has been formed of polyethylene along with the cap 32 while the guide 38 was formed of Teflon (tetrafluoroethylene resins) to provide an element with greater resistance to heat. Generally, non-metallic components of the housing or cartridge C are advantageous to avoid metal oxides in the packing. Essentially, a heat-stable material is desirable.

Upon completion of the basic component parts as described above, the packing 42 is loaded into the body 18. In one successful operating embodiment, the packing 42 comprises shavings or cuttings, e.g. elongated pieces or particles which are generally non-mating and will not pack into a solid mass. That is, it is important that the packing 42 be somewhat open or porous. Recognizing that various materials might be employed as the solid carrier in the Teflon packing 42, such materials should generally have the characteristics of being heat resistant, not heat conductive, non-abrasive, non-corrosive, and chemically stable, i.e. not productive of oxides or other contaminants on being heated.

The packing 42 as described in the present embodiment includes elongated particle members 50 (FIG. 3) which carry a cleaning agent in the form of a layer or filling 52. In one successful operating embodiment, the filling 52 comprises ammonium chloride in a gel solution. Of course, various equivalents may be apparent to those skilled in the art. Certain characteristics are generally desirable. Specifically, the filling is deemed to advantageously take the form of halide and specifically, non-metallic halides appear most desirable. The compound should have the characteristic of subliming at relatively-low temperatures, with the result that the compound will rapidly disappear from the working surface of a hot slodering iron. Generally, it also is advantageous to provide the components of the filling 52 as non-toxic ingredients. In addition to the cleaning ingredient, e.g. ammonium chloride, a quantity of alcohol or other solvent is effective for providing a solution in a liquid or semi-liquid form, e.g. gel.

Various techniques have been employed for placing the packing 42 within the body 18. However, it has generally been found effective to dip or otherwise provide the filling 52 on the members 50 before placement as the packing 42.

In using the appliance as indicated above, the hot working surface or tip T(FIG. 1) of a soldering iron is simply inserted into the indentation 48. The physical and/or chemical results are not readily apparent; however, upon immediate withdrawal of the tip T, the working surfaces are effectively dressed. Specifically, the tip T of the iron is cleaned of oxides and other contaminants. Additionally, a coating of solder remains on the working surfaces to protect the usual plating. In addition to these results, it is apparent that the working surfaces of the iron remains hot as relatively-little heat transfer may occur through the packing 42. Another consideration resides in the fact that the action is almost instant. For example, manually inserting the iron into the indentation 48 and immediately withdrawing it is completely effective, the operation being performed at a convenient speed so that the iron is actually within the indentation 48 for only a second or so.

The cleaning action apparently is accomplished to some extent by the vaporization of some of the filling 52. However, it also appears that the effective operation involves the combined physical or mechanical action of the members 50 on the tip T along with the suspension of the filling 52 which is evaporated at tip temperatures.

Typically, immediately prior to using a soldering iron, the tip T will be covered with a coat of solder, the surface of which has become an undesirable oxidized skin. Upon insertion of the tip into the indentation 48 as described above, a small quantity of the suspended filling 52 vaporizes which action along with the action of the perforate packing 42 is almost explosive in effectively removing the oxide skin, yet leaving the solder coating intact and at a working temperature. With prolonged use, the packing becomes ineffective; however, in that regard, the appliance disclosed herein incorporates specific structural components to prolong the operative life. From the time of manufacture until the appliance is placed in use, the cap P is maintained in position to close the space containing the packing 42. Generally, the cap 32 also is to be kept on the cartridge C between intervals of actual use.

Upon placing the appliance in use, as suggested above, the cartridge C may be employed with or without the stand H. Essentially, the stand H affords a convenient operation in which the cap 32 is removed to be held in one hand while the other hand acts to insert the tip T of the soldering iron through the guide 38 and into the indentation 48. It is to be noted that the indentation 48 need not be preformed, rather it will result simply from the initial use of the appliance.

After inserting and withdrawing the soldering iron with one hand, the other hand replaces the cap 32 completing the operation. Alternatively, using the cartridge C independently of the stand H may be somewhat less convenient; however, is readily feasible and practical.

Recognizing that varying conditions and methods of use will result in various periods of operability, preliminary indications suggest that a cartridge will have a bench life of many weeks. That life is somewhat extended by revolving the guide 38 to displace the open portion 47 for re-positioning the indentation 48. Thereafter, economics presently appear to suggest that cartridges are not suitable for repair. Conversely, a fresh cartridge C is simply inserted in the stand H for another period of operating use.

The appliance of the present invention provides a very effective apparatus for dressing a soldering iron. However, the detailed scientific explanation of the precise nature of the operation is not readily apparent at the present time. However, it is understood that the operation of the appliance involves the combined action of solid pieces or particles to provide an open packing base and a filling carried in the packing, which is vaporized at soldering iron temperatures. Recognizing the possibility of variously embodying such structure as a solder-iron dressing appliance, it is understood that the scope hereof should not be limited to the disclosed embodiment as currently deemed best, but rather should be in accordance with the scope of the claims set forth below.

What is claimed is:

1. A process for treating the working end of a soldering iron while at an elevated temperature comprising the steps of:
   providing a tetrafluoroethylene resin material in a porous mass;
   placing a non-metallic halide on exposed surfaces of said material to provide a dressing member; and
   contacting said dressing member with said working end whereby to sublime a quantity of said halide for treating said working end, as by removing oxide skin.

2. A process according to claim 1 wherein said cleaning agent comprises a non-metallic halide and a solvent in a gel form.

3. A process according to claim 1 wherein said cleaning agent comprises ammonium chloride.

4. An apparatus for treating the working end of a soldering iron, comprising:
   a housing for containing treatment components and including a guide defining a space for receiving said working end of said soldering iron;
   a packing in said housing including a non-corrosive, non-abrasive, non-metallic, tetrafluoroethylene resin material stable at operating temperatures of said soldering iron, and in a porous form and fixed to engage said working end of said soldering iron received through said guide; and
   a cleaning agent disposed in said packing to provide vapor upon being heated, as by engagement with said working end of a soldering iron to thereby dress said working end.

5. An apparatus according to claim 4 wherein said guide in said housing is displaceable with reference to said packing to alter the engagement location of said working end of said soldering iron on said packing.

6. An apparatus according to claim 4 further including a support stand for receiving said housing.

* * * * *